J. C. WILSON.
FLUID METER.
APPLICATION FILED MAY 2, 1917.
1,279,626.
Patented Sept. 24, 1918.
6 SHEETS—SHEET 5.
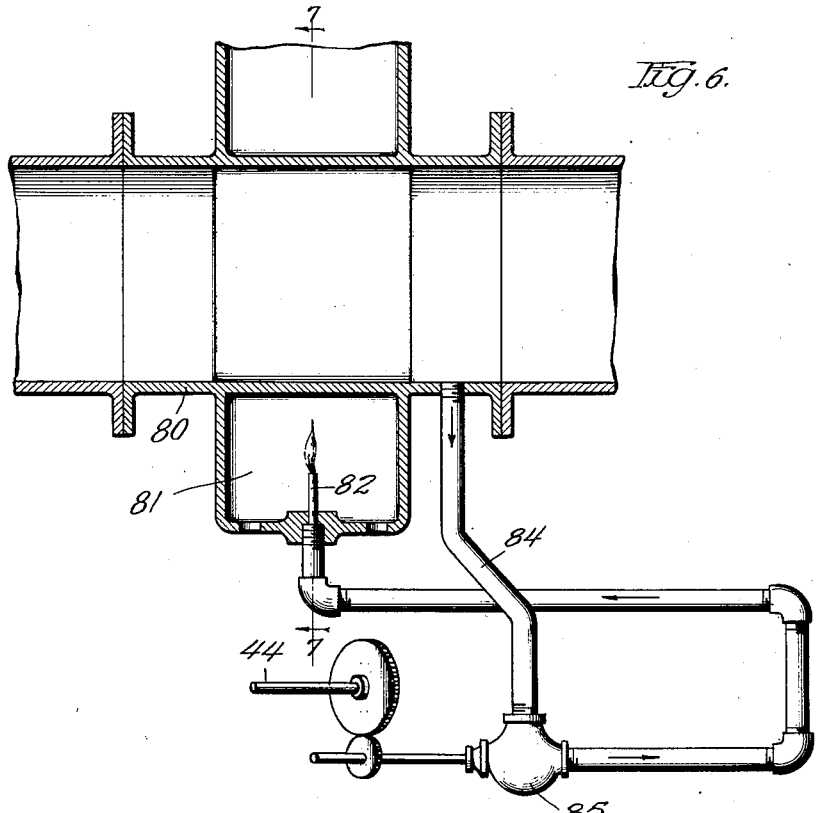
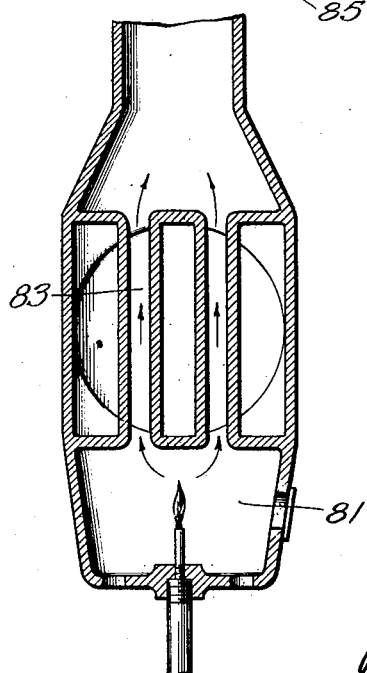
Witnesses:
Robert H. Weir
Arthur W. Carlson
Inventor
John C. Wilson
by Edwin B. H. Tower, Jr.
Atty.

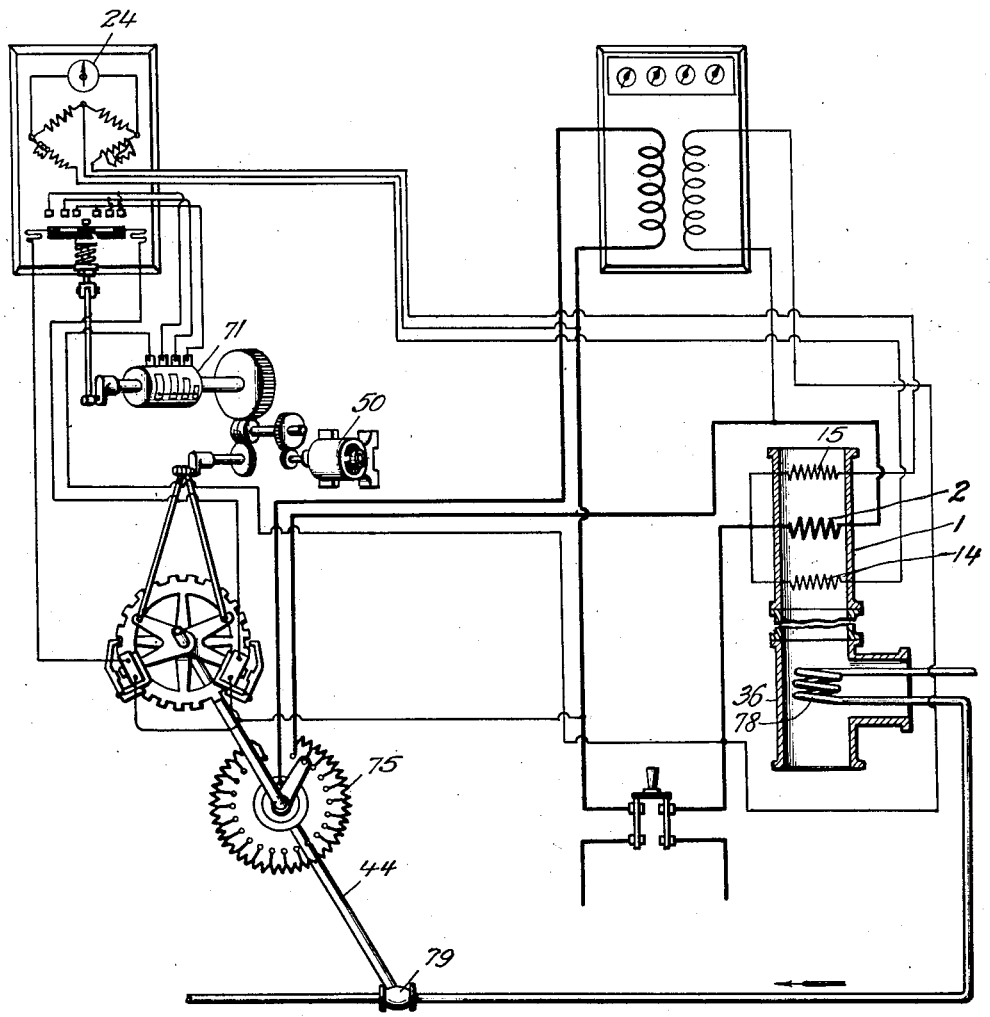

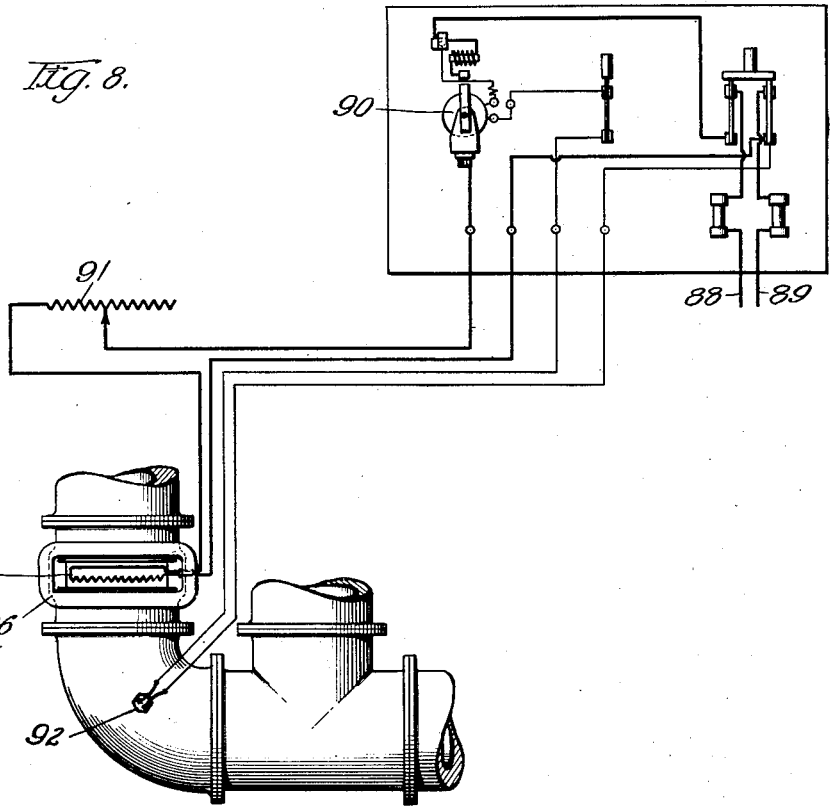
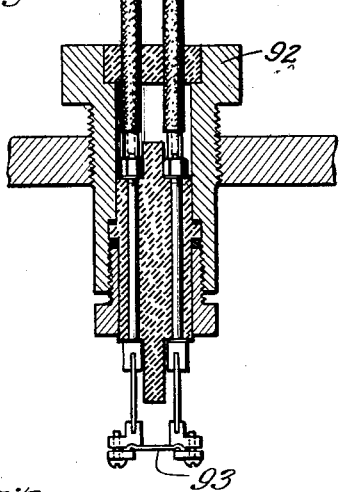
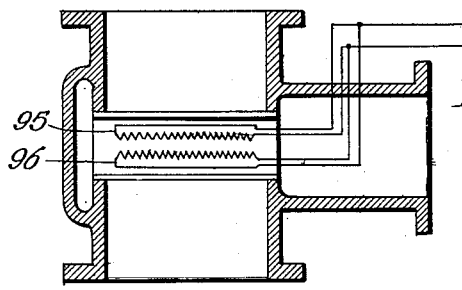
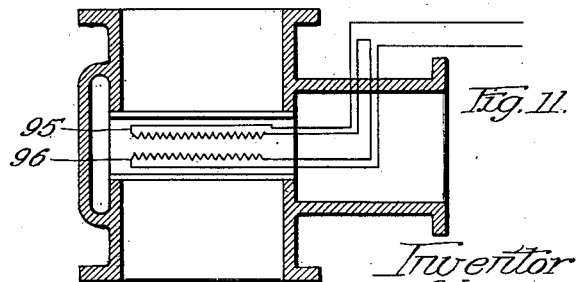

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID-METER.

1,279,626.

Specification of Letters Patent.

Patented Sept. 24, 1918.

Application filed May 2, 1917. Serial No. 165,829.

*To all whom it may concern:*

Be it known that I, JOHN C. WILSON, a citizen of the United States, residing at Milwaukee, in the county of Milwaukee and State of Wisconsin, have invented new and useful Improvements in Fluid-Meters, of which the following is a specification.

This invention relates to meters.

It relates particularly to meters for measuring the flow of fluids such as steam, vapors, gases and the like, although it is not limited to such use.

Steam and gases often carry appreciable quantities of water or water vapor, the presence of which is due to many causes. The steam or gas may be saturated with water vapor at the point where it is generated or in the cleaning and cooling processes and as the gas passes through the distributing system to storage tanks or to points where it is consumed, its temperature decreases with a consequent condensation of some of the water vapor to water. This condensed water may be carried along mechanically with the flowing stream of gas, some of it flowing along the inner surface of the conduit through which the gas is passing, and some of it being carried in suspension in the stream of gas in the form of minute globules of water in the nature of water fog. Moisture may of course be present in the gas due to other causes.

When this wet steam or gas is passed through a meter, the moisture condenses on the meter parts and interferes with accuracy of the meter. Errors are thus introduced. The present invention relates to means for eliminating these errors. It is illustrated and described in connection with thermal fluid meters, although it is applicable to meters of other types.

Thermal fluid meters employ thermal or thermodynamic effects for measuring the flow of fluids. The specific heat of the fluid being known, the flow is measured by determining the effect of heat transfer between a stream of the fluid and means subject thereto. The meters may employ various methods for measuring the flow by thermal effects. Heat may be imparted to or absorbed from a flowing stream of fluid and the temperature changes in the fluid observed. The specific heat of the fluid being known the variations in its temperature are a measure of the rate of flow. Any one of the variables involved in such a measurement may be kept constant and the others measured to determine the rate of flow. The flow may also be measured by determining the cooling effect of the flowing fluid on a source of heat subjected to said fluid, or by determining the heating effect of said fluid on a cooler body which is subjected to said fluid, all of these methods depending upon heat transfer to or from the fluid.

When the fluid to be measured is wet the moisture tends to interfere with the simple relations underlying the heat transfer and the effect of this transfer and introduces inaccuracies in the meter. When heat is imparted to the fluid, a portion of the heat must be used to vaporize the moisture before a rise in temperature of the fluid can be produced. Furthermore in some types of meters the calibration is dependent upon the rate of heat dissipated from the heater, or to the cooler, per unit area of same. Any moisture on the surface of the heater or the cooler would affect the rate of heat transfer from or to the surface. Then again, moisture tends to hasten corrosion of surfaces in gas atmospheres and therefore the surface condition of the heater or cooler is radically changed by any moisture present.

It is accordingly important that means be provided which will insure that the fluid to be measured is thoroughly dry before it enters the meter. It is further important that means be provided for varying the effect of the drying means since variations in the rate of flow vary the demand upon the drying means.

One of the objects of the invention is to provide an improved meter having means for drying the fluid before it reaches the meter and means for varying the effect of the drying means on the fluid.

Another object is to make the drying means automatically responsive to the rate of flow of the fluid.

Another object is to provide an improved meter having means for heating the fluid to dry the same before it reaches the meter, the quantity of energy supplied to said heating means being automatically regulated in accordance with the flow of fluid.

Another object is to provide an improved thermal fluid meter having means for automatically drying the fluid entering the meter in response to the rate of flow of fluid.

Another object is to provide an improved method of measuring the flow of fluid.

Other objects and advantages of the invention will hereinafter appear.

The invention is illustrated in the accompanying drawings in which—

Fig. 5 is a diagrammatic view of a thermal fluid meter similar to that shown in Figs. 2 and 3 and illustrates how the effect of a fluid or liquid drying medium may be automatically controlled in accordance with the rate of flow of the fluid to be measured.

Fig. 6 is a diagrammatic view illustrating the manner in which the effect of a drying means utilizing products of combustion may be automatically varied in accordance with the rate of flow of the fluid.

Fig. 7 is a vertical section taken on the line 7—7 of Fig. 6.

Fig. 8 is a diagrammatic view illustrating means for automatically rendering the drying means inoperative when the rate of flow of the fluid is very low, or when the fluid ceases to flow altogether.

Fig. 9 is a detail view showing in section the fuse plug employed in Fig. 8, and Figs. 10 and 11 are diagrammatic views of electrical drying means having several heating coils and illustrate how the drying effect may be varied by varying the electrical connections between the coils.

The drying means, which will hereinafter be referred to as the preheater, is disclosed in combination with a thermal fluid meter of the type shown in the patent to C. C. Thomas, No. 1,222,492 of April 10, 1917. A meter of this type is commonly known as a Thomas meter.

Figure 1:
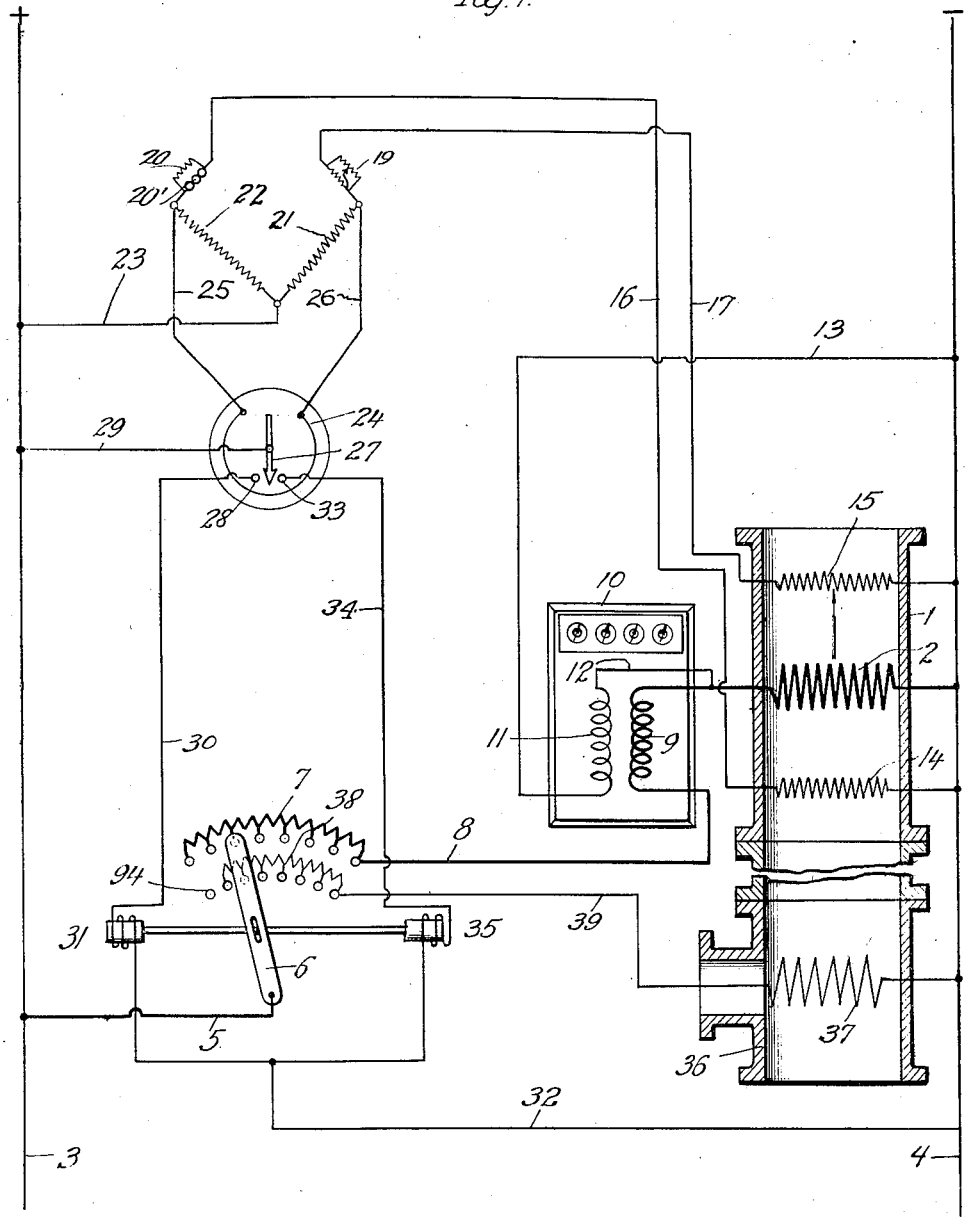
Figure 1 is a simplified diagrammatic view representing a thermal fluid meter, drying means for the fluid and means for automatically varying the effect of the drying means in accordance with the rate of flow of the fluid.

Fig. 1 is a simplified diagram showing a Thomas meter and an electric preheater for the fluid to be measured, and shows the manner in which the current supplied to the preheater may be varied in accordance with the rate of flow of the fluid.

The meter comprises a heater which is automatically controlled by a pair of thermometer resistances to maintain a predetermined constant temperature rise in the fluid. If this be done then the energy consumed by the heater in maintaining this constant temperature rise will be a measure of the rate of flow of the fluid.

The housing of the meter is shown at 1. It constitutes a conduit through which the fluid to be measured flows in the direction of the arrow. An electric heating coil 2 is positioned in the conduit 1 and is connected across the supply mains 3 and 4. Current is supplied to the heater 2 through a conductor 5, a rheostat arm 6, variable resistance 7, conductor 8, and through the current coil 9 of the wattmeter 10. This circuit is represented by the heavy lines. The voltage coil 11 of the wattmeter 10 is connected in shunt with the heating coil 2 by the conductors 12 and 13. When the rheostat arm 6 is actuated to vary the resistance 7 the current supplied to the heating coil 2 is varied, thus varying the amount of heat dissipated from the coil. The wattmeter 10 measures the wattage consumed by the heater.

Thermometer resistances 14 and 15 whose resistance varies as their temperature varies are placed on opposite sides of the heating coil 2. These thermometer resistances are connected at one side to the supply main 4, and at the other side by means of conductors 16 and 17 to a Wheatstone bridge. The thermometer resistances 14 and 15 constitute two arms of the Wheatstone bridge. The other two arms 21 and 22 of the Wheatstone bridge are connected by means of a conductor 23 to the supply main 3.

A galvanometer 24 is bridged across the resistances of the Wheatstone bridge by conductors 25 and 26. When the Wheatstone bridge is unbalanced the needle 27 of the galvanometer will be deflected to one side or the other.

The Wheatstone bridge is provided with an adjusting resistance 19 in one side and in its opposite side there is provided a resistance 20 adapted to be shunted out by means of an ordinary plug switch 20'. The resistance 20 is intended to correspond to the change in resistance of thermometer resistance 15 due to the predetermined increase of temperature produced by the heating coil 2. In the adjustment of the Wheatstone bridge the bridge is balanced in the ordinary manner, the plug 20' being first inserted so as to shunt out the resistance 20 and adjusting resistance 19 being adjusted until no, or substantially no, current flows through the conductors 25 and 26, indicating that both sides of the bridge are in balance. The plug is then removed, at once throwing the bridge out of balance and therefore deflecting the needle 27; but, as will hereinafter appear, the balance of the bridge will be restored and the needle 27 will be brought back to normal position when, by the action of the heating coil, the resistance of the thermometer resistance 15 has been changed an amount corresponding to the predetermined rise in temperature desired to be maintained.

If the galvanometer needle 27 is deflected to the left in the drawing the needle will engage a contact 28 and a circuit will then be completed from the supply main 3 through a conductor 29 connected to the needle 27, through contact 28, conductor 30, electro-magnet 31 and conductor 32 to the supply main 4. If the needle 27 is deflected to the right in the drawing it will engage a contact 33 and a circuit will then be completed through the conductor 29, galvanometer needle 27, conductor 34, electro-magnet 35, and conductor 32 to the supply main 4. The two electro-magnets 31 and 35 are connected to the rheostat arm 6. When the electro-magnet 31 is energized the rheostat arm 6 is moved in one direction to vary the resistance 7, and when the electro-magnet 35 is energized the rheostat arm 6 is moved in the opposite direction to vary the resistance 7. The resistance 7 is, therefore, automatically varied in accordance with the deflections of the galvanometer needle 27.

It will now be seen that the function of the parts above described is to maintain a constant difference in resistance between the thermometer resistances, or, in other words, a constant temperature rise in the fluid between the points where the thermometer resistances 14 and 15 are located. The thermometer resistance 14 assumes the same temperature as the incoming fluid and the thermometer resistance 15 assumes the temperature of the fluid after it has been heated. When the meter is in operation the Wheatstone bridge will be balanced so long as the heater 2 is imparting just sufficient heat to the fluid to maintain a constant temperature rise between the points where the resistances 14 and 15 are located. As the rate of flow of the fluid through the meter varies it is obvious that the amount of heat dissipated from the heater will have to be varied to maintain the constant temperature rise in the fluid. If the rate of flow decreases the fluid will be heated to a greater extent, and the resistance of the thermometer resistance 15 relative to the resistance of the thermometer resistance 14 will change, thus unbalancing the Wheatstone bridge. This will deflect the galvanometer needle to the left and cause the electro-magnet 31 to insert more resistance of the rheostat in series with the heating coil 2. This will reduce the heating effect of the heater until the Wheatstone bridge again balances. On the other hand, if the rate of flow of the fluid increases the fluid will not be heated sufficiently to maintain the constant temperature rise. A change in the resistance of the thermometer resistance 15 relative to the resistance of the thermometer resistance 14 will then unbalance the Wheatstone bridge and cause the galvanometer needle to complete a circuit through the electro-magnet 35. This will remove some of the resistance 7 from the circuit of the heating coil 2 thus increasing the heating effect of the heater. The amount of heat dissipated from the heating coil is, therefore, automatically varied to maintain a constant difference between the resistances of thermometer resistances 14 and 15, or, in other words, to maintain a constant temperature rise of the fluid between the points where these thermometer resistances are located. The amount of heat required to maintain this constant temperature rise is a measure of the rate of flow of the fluid. Therefore, by reading the wattmeter 10 and referring to suitable calibration curves the rate of flow of the fluid may be determined, or, if desired, the wattmeter 10 may be calibrated to read directly in terms of rate of flow of the fluid.

The housing for the preheater is shown at 36. This housing contains an electric heating coil 37 which is connected across the mains 3 and 4. As the rheostat arm 6 moves it serves to vary resistance 38 connected in series with the heating coil 37 by means of the conductor 39. From the above description it is obvious that the arm 6 is shifted in accordance with the variations in the rate of flow of the fluid. Therefore, the current supplied to the coil 37 is varied in accordance with the rate of flow of the fluid because the arm 6 varies the resistance in series with the coil 37. As the rate of flow decreases the current supplied to the heating coil 37 is decreased thus reducing the heating effect of the coil. As the rate of flow of the fluid increases the current supplied to the heating coil 37 is increased, thus increasing the heating effect of the coil.

Figure 2:
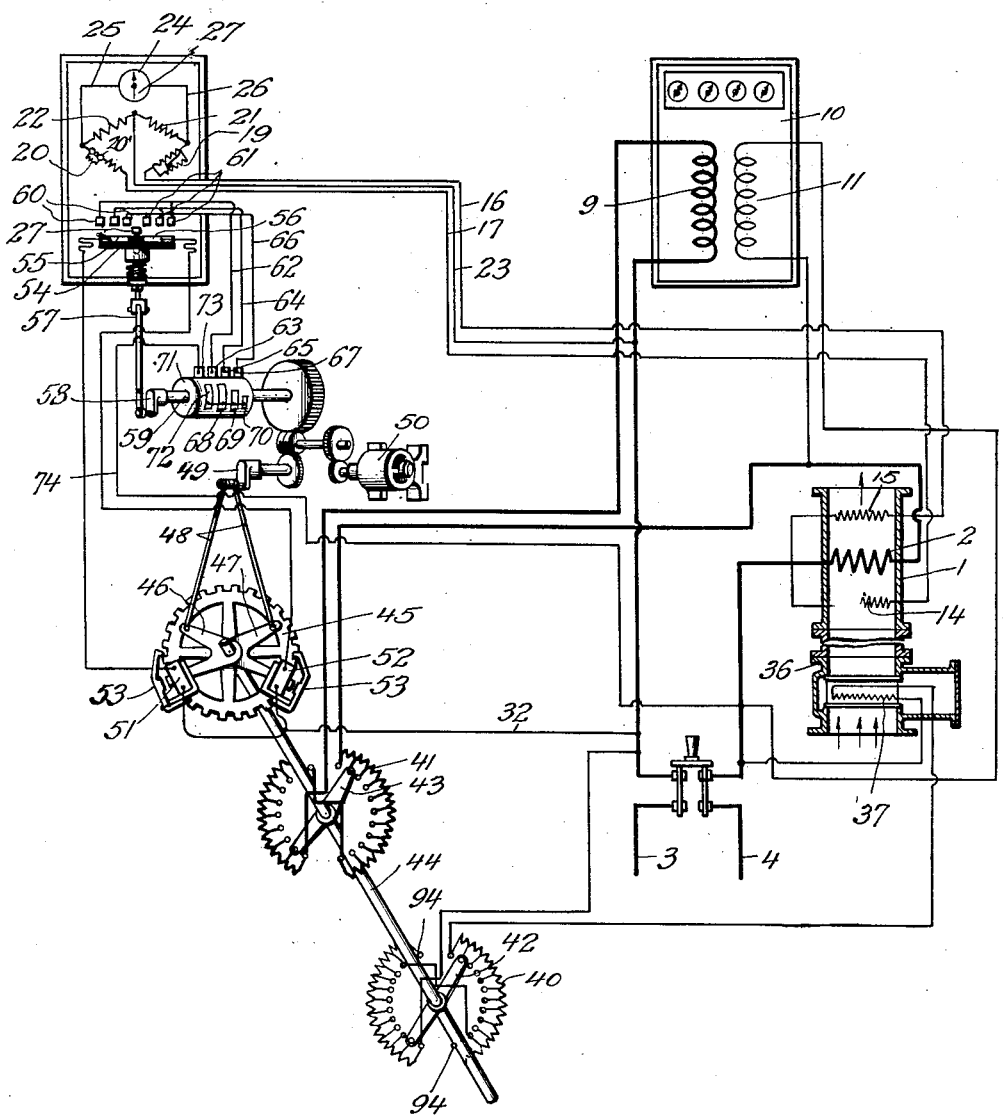
Fig. 2 is a diagrammatic view of a commercial form of the apparatus shown in Fig. 1.

Fig. 2 is a diagrammatic representation of a commercial form of the apparatus shown in Fig. 1. The underlying principles of operation, however, are exactly the same. In Fig. 2 the current supplied to the preheater coil 37 is varied by means of a rheostate 40 which corresponds to the rheostat 38 in Fig. 1. The current supplied to the heating coil 2 is varied by means of rheostat 41 which corresponds with the rheostat 7 in Fig. 1. The rheostat arm 42 of the rheostat 40, and the arm 43 of the rheostat 41 are both mounted upon a shaft 44 carrying a ratchet wheel 45. Two rocker arms 46 and 47 are loosely mounted upon the end of the shaft 44. These rocker arms are continuously oscillated by means of connecting rods 48 connected to a crank 49. The crank 49 is rotated from a motor 50 by suitable reduction gearing. An electro-magnet 51 is carried by the rocker arm 46 and a similar electro-magnet 52 is carried by the rocker arm 47. These electro-magnets correspond to the electro-magnets 31 and 35 of Fig. 1. These magnets serve when energized to actuate pawls 53. The pawls 53 are normally out of engagement with the teeth of the ratchet wheel 45, but when either of the pawls is attracted by its electro-magnet the pawl engages a tooth on the ratchet wheel.

The Wheatstone bridge shown in Fig. 2 is substantially the same as that shown in Fig. 1 and is connected to the thermometer resistances 14 and 15 in the same manner as in Fig. 1. Furthermore, the galvanometer 24 is connected across the resistances of the Wheatstone bridge by the conductors 25 and 26 in the same manner as in Fig. 1. The needle 27 of the galvanometer is diagrammatically shown in association with the galvanometer and is represented again just below the Wheatstone bridge to illustrate how the needle controls the circuits of the electromagnets 51 and 52. The needle swings over a support 54 which carries two contact strips 55 and 56. These correspond to the contacts 28 and 33 in Fig. 1. The support 54 is reciprocated in a vertical direction by means of a connecting rod 57 and crank 58. The crank 58 is associated with the end of a shaft 59 which is rotated from the motor 50 by suitable reduction gearing. Just above the needle 27 is a series of contacts arranged in two groups. Those of the first group are shown at 60 and are located above the contact strip 55, and those of the second group are shown at 61 and are located above the contact strip 56. In the present instance there are three contacts in each group. The two extreme contacts are connected by means of a conductor 62 to a finger 63. Likewise the next two contacts are connected by means of a conductor 64 to a finger 65, and two innermost contacts are connected by means of a conductor 66 to a finger 67. The contacts 63, 65 and 67 coöperate with contact segments 68, 69 and 70 respectively carried by a drum 71 which is mounted upon the shaft 59. The contact segments 68, 69 and 70 are electrically connected to each other and to a fourth contact segment 72. This segment 72 coöperates with a finger 73 which is connected by means of a conductor 74 to one of the supply mains. The contact segments 68, 69 and 70 are of successively increasing length for a purpose hereinafter described.

As the drum 71 rotates the support 54 is reciprocated. If the needle 27 has been deflected to one side or the other by an unbalancing of the Wheatstone bridge, it will be clamped, when the support 54 moves upwardly, between one of the contact strips on the support and one of the contacts above the support. If the needle is deflected to the left in the drawing a circuit will be completed through the magnet 51 by the drum 71, and if the needle is deflected to the right a circuit will be completed through the magnet 52 by the drum 71. The purpose of the contacts 60 and 61 and the segments on the drum 71 is to determine the length of time that the magnets 51 and 52 will be energized. If the needle 27 is deflected only a small amount to the left it will be clamped against the innermost contact 60 and then when the drum 71 has rotated a sufficient distance to bring the segment 70 under the finger 67 a circuit will be completed through the magnet 51, contact strip 55, conductor 66, finger 67, segment 70, segment 72, finger 73 and conductor 74. The magnet 51 will be energized until the segment 70 passes from under finger 67. The segment 70 is of such length that the magnet will be energized only long enough to move the ratchet a distance of one tooth. If the needle had been deflected to the right the same amount a circuit would have been completed through the magnet 52 and through the same segment 70. In this case the ratchet wheel would be rotated a distance of one tooth but in the opposite direction. Likewise if the needle 27 is clamped under the middle contact 60 or the middle contact 61 a circuit will be completed through the contact segment 69 and one of the electro-magnets, depending upon in which direction the needle swings. The segment 69 is of such length that the magnet will be energized long enough to move the ratchet wheel a distance of two teeth. If the needle swings a sufficient distance to be clamped under either of the extreme contacts 60 or 61 the circuit to one of the magnets will be completed through the segment 68 which is of such length as to energize the magnet long enough to move the ratchet wheel 45 a distance of three teeth. The amount of movement of the ratchet wheel 45 and its direction of movement therefore depend upon the amount of deflection of the galvanometer needle and its direction of deflection. The rheostat 41 is therefore varied an amount which depends upon the amount of deflection of the galvanometer needle.

As the rheostat for the preheating coil 37 is actuated from the same shaft as the rheostat for the heating coil 2 of the meter, it is obvious that the current supplied to the preheating coil will be automatically varied in accordance with the rate of flow of the fluid.

Figure 3:
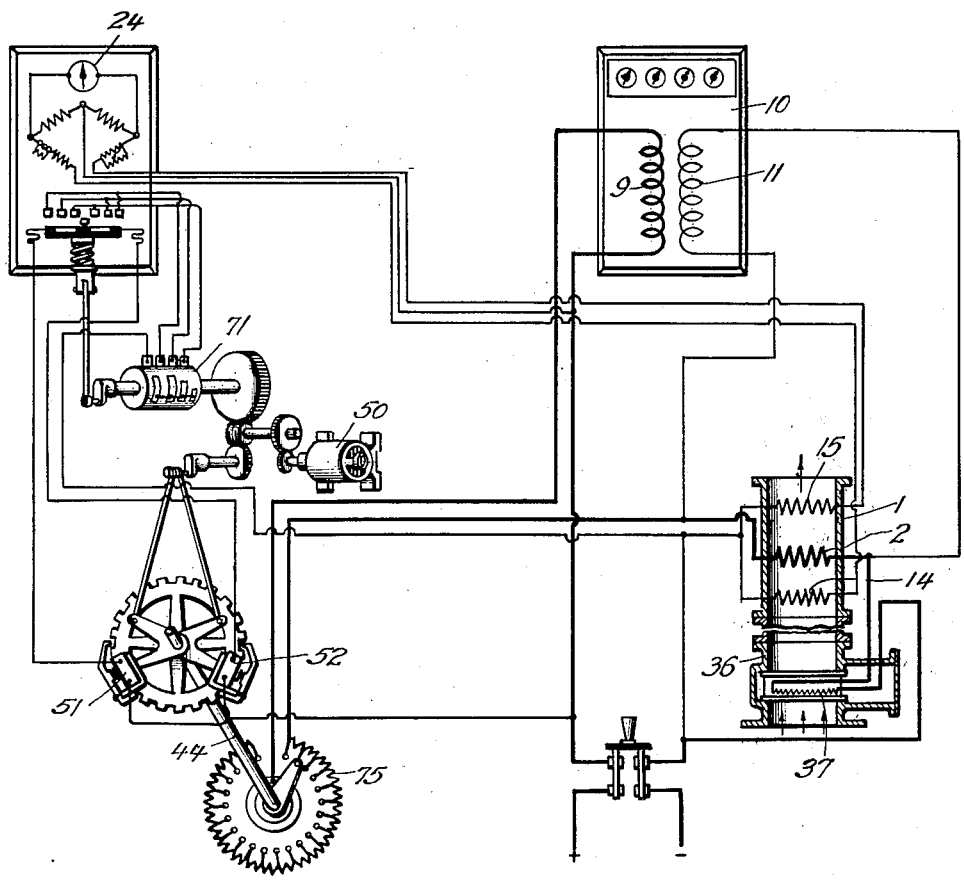
Fig. 3 is a view similar to Fig. 2 but illustrates a different manner of automatically varying the effect of the drying means.
Figure 4:
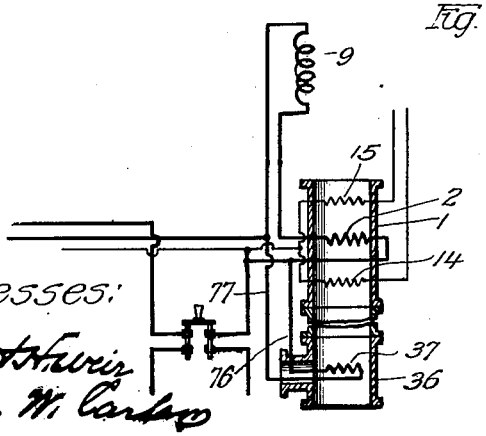
Fig. 4 is a diagrammatic view showing the electric drying coil connected with the electric heater of the meter in a different manner from that shown in Fig. 3.

In Fig. 3 the rheostat for the preheating coil is omitted and a single rheostat 75 actuated from the shaft 44 serves to vary the energy supplied to both the heating coil 2 of the meter and the preheating coil 37. This is accomplished by connecting the preheating coil 37 in series with the heating coil 2 as shown by the heavy lines. The energy supplied to the preheating coil 37 is therefore automatically varied in accordance with the rate of flow of the fluid, because it is connected in series with the heating coil 2 and the energy supplied to the heating coil 2 is varied in accordance with the variations in the rate of flow of the fluid. The same result may be obtained by connecting the preheating coil 37 in parallel with the heating coil 2. Such an arrangement is shown in Fig. 4. In Fig. 4 the preheating coil 37 is connected across the heating coil 2 by means of the conductors 76 and 77. In Fig. 4 the energy supplied to the heating coil 2 and the preheating coil is controlled by the rheostat 75 in the same manner as shown in Fig. 3. The only material difference between Fig. 4 and Fig. 3 is that the preheating coil is connected in parallel with the heating coil 2 instead of in series therewith.

Obviously the preheater need not be of the electrical type. A steam or hot water coil located in the path of the fluid would serve to preheat and dry the same in the same manner that the electrical preheating coil 37 dries the fluid.

Fig. 5 illustrates the use of a preheater having a coil 78 located in the housing 36. Hot water or steam or any other heated fluid medium may be circulated through this coil. In order to vary the amount of heat dissipated from the coil 78 in accordance with the rate of flow of the fluid through the conduit a valve 79 is provided. This valve is connected with the shaft 44 of the rheostat 75. As the rate of flow of the fluid varies and as the shaft 44 rotates to vary the resistance 75 it is obvious that the valve 79 will be actuated to control the flow of heating fluid through the coil 78. The heating fluid supplied to the coil 78 is therefore varied automatically in accordance with the variations in the rate of flow of the fluid.

Figs. 6 and 7 show a gas preheater the housing 80 of which is located in the gas main just ahead of the meter. In these figures the meter is not shown. A portion of the housing of the preheater forms a heating chamber 81 in which there is located a burner 82. The heated air and products of combustion pass upwardly through tubes 83 and the fluid to be measured is caused to flow by these tubes and be heated thereby. The burner 82 may be supplied with fuel from any suitable source. When the gas being measured is serviceable as fuel a portion of the gas may be taken from the main by a pipe 84 and supplied to the burner. A valve 85 which corresponds to the valve 79 in Fig. 5 is actuated from the shaft 44 in the same manner that the valve 79 is actuated in Fig. 5. As the shaft 44 is rotated in accordance with the variations of the rate of flow of the fluid to be measured it is obvious that the gas supplied to the burner 82 will be varied in accordance with the rate of flow of the fluid and hence the heat supplied by the burner will also be automatically varied in accordance with the rate of flow of the fluid through the conduit.

Fig. 8 discloses means for controlling the supply of energy to the preheater by rendering the preheater ineffective when the fluid flows slowly through the conduit or ceases to flow altogether. The housing of the preheater is shown at 86 and the preheating coil is shown at 87. Current is supplied to the preheating coil 87 from the mains 88 and 89 through an electro-magnetic switch 90 and rheostat 91. In this case the rheostat 91 may be a manually operated rheostat and the energy supplied to the preheating coil may therefore be varied by hand in accordance with the rate of flow of the fluid as indicated by the meter. The electro-magnet of the switch 90 is normally energized by current passing through the circuit indicated by the relatively light lines. This circuit contains a fuse plug 92 which is adapted to be screwed into the top of the conduit as shown in Figs. 8 and 9 at a point closely adjacent to the preheater. In this figure the conduit is represented in plan view. The plug 92 has a fuse ribbon 93 associated therewith through which the current must pass in order to maintain the circuit of the electromagnetic switch 90 closed. The fuse ribbon 93 is designed to melt at a predetermined temperature beyond which injury might be done to the meter parts. As the rate of flow of the fluid decreases or if the fluid ceases to flow altogether the preheater may heat the fluid to such an extent that the excessive heat may cause injury to various parts of the apparatus such as the parts of the meter, packing material in joints, etc. However, before this temperature is reached the fuse of the plug 92 melts and breaks the retaining circuit of the electro-magnetic switch 90 thus causing this switch to open. When the switch 90 breaks the circuit of the preheating coil is opened thus rendering the preheating coil ineffective.

Substantially the same result produced in Fig. 8 may be obtained in Figs. 1 and 2 by making the last one or more contacts of the preheater rheostat blank contacts as shown at 94. As the rate of flow decreases and the shaft 44 is actuated to insert resistance in series with the heating and preheating coils the arm 6 in the case of Fig. 1 and the arm 42 in the case of Fig. 2 will eventually move to the blank contact or contacts 94 and break the circuit of the preheating coil. This is merely a precautionary measure to prevent the fluid from being excessively heated when the rate of flow of the fluid becomes very low in value.

Figs. 10 and 11 show still another way of varying the effect of the preheater. In these figures only the housing of the preheater is shown and instead of one preheater coil several coils are employed. In the present instance two coils indicated at 95 and 96 are used. The conductors of these coils may be connected to suitable terminals at an accessible point outside of the preheater housing where the electrical connections between the coils 95 and 96 may be changed. Only one coil of the preheater may be used, or both may be used and connected either in series or in parallel. The amount of heat dissipated from the preheater will be different in each case. In Fig. 10 the two coils 95 and 96 are shown connected in parallel, whereas in Fig. 11 they are shown connected in series. The preheating coils in Figs. 10 and 11 may be connected directly across the supply mains if desired because the change from one to two coils and from series to parallel connections or vice versa, may sufficiently vary the heating effect of the preheater to take care of considerable changes in the rate of flow of the fluid.

It will now be seen that in all of the figures there is disclosed means for controlling the supply of energy to the preheater to vary the heating effect of the preheater when the rate of flow of the fluid changes. In some instances the preheater is even rendered ineffective when the fluid flows very slowly or ceases to flow altogether.

Although the preheater and its controlling and regulating means have been illustrated in connection with a Thomas meter it will be understood that the specific type of meter employed is immaterial to the invention. Furthermore, the exact type of preheater employed is immaterial as is evidenced by the fact that a number of different types of preheaters are herein disclosed.

The invention has been specifically described for illustrative purposes only and various changes and modifications may be made without departing from the scope of the invention as defined by the accompanying claims.

What I claim is:

1. The combination with a fluid meter of means for drying the fluid before it enters the meter and means for automatically controlling the drying means in accordance with the rate of flow of fluid.

2. The combination with a fluid meter of means for supplying heat to a stream of fluid entering the meter to dry said fluid before it enters the meter and means for automatically controlling the heating means in accordance with the rate of flow of fluid.

3. The combination with a fluid meter of electrical heating means for supplying heat to a stream of fluid to dry said fluid before it enters the meter and means for automatically controlling the supply of energy to said electrical heater in accordance with the rate of flow of fluid.

4. The method of measuring the flow of fluids which consists in passing a stream of fluid into heating proximity to a supply of heat, varying said heat supply in accordance with the rate of flow of fluid to dry said fluid, and measuring the flow of the dry fluid.

5. The method of measuring the flow of fluids which consists in passing a stream of fluid into heating proximity to an electrical heating means to dry the same, varying the energy supply to said heating means in accordance with the rate of flow of fluid and measuring the flow of dry fluid.

6. The combination with a meter for measuring the flow of fluids by thermal effects of means for drying the fluid before it enters the meter and means for automatically controlling the drying means in accordance with the rate of flow of fluid.

7. The combination with a fluid meter of means for heating the fluid before it enters the meter and means for controlling the heating means in accordance with the rate of flow of fluid for the purpose of insuring accuracy of the meter for different rates of flow.

8. The combination with a fluid meter of means for drying the fluid before it enters the meter and means for controlling the drying means in accordance with the rate of flow of fluid for the purpose of insuring accuracy of the meter for different rates of flow.

9. The combination with a fluid meter of means for heating the fluid before it enters the meter and means for changing the rate of supply of energy to said heating means when the rate of flow of fluid changes to insure accuracy of the meter for different rates of flow.

10. The combination with a fluid meter of means for heating the fluid before it enters the meter and means for automatically rendering said heating means ineffective when the rate of flow of the fluid decreases to a low value.

11. The combination with a fluid meter of means for heating the fluid before it enters the meter and means for automatically rendering said heating means ineffective when the flow of fluid ceases.

12. The combination with a fluid meter of means for heating the fluid before it enters the meter and means whereby the heat dissipated from the heater may be varied for the purpose of insuring accuracy of the meter for different rates of flow of the fluid.

13. The combination with a fluid meter of means for heating the fluid before it enters the meter, and means for automatically rendering said heating means ineffective when the rate of flow of the fluid decreases to such a value that the heat imparted to the fluid by said first named means may produce injurious effects.

In witness whereof, I have hereunto subscribed my name.

JOHN C. WILSON.